Figure 1:
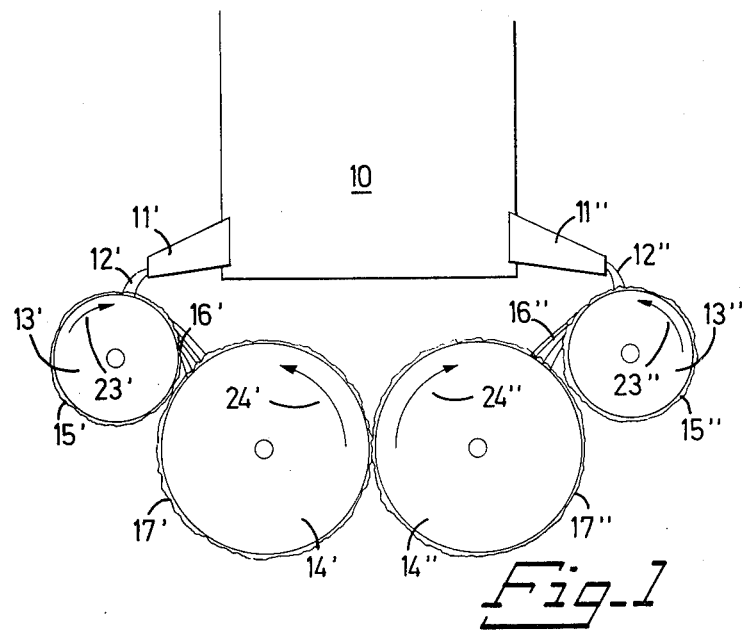

United States Patent [19]

Alenrot et al.

[11] 4,119,421
[45] Oct. 10, 1978

[54] ARRANGEMENT FOR FIBRATION OF MOLTEN MINERAL

[75] Inventors: Lennart Alenrot; Willy Hartung; Torbjorn Lund; Ulf Åberg, all of Skövde, Sweden

[73] Assignee: Rockwool Aktiebolaget, Skövde, Sweden

[21] Appl. No.: 804,294

[22] Filed: Jun. 7, 1977

[30] Foreign Application Priority Data

Jun. 30, 1976 [SE] Sweden .................... 7607456

[51] Int. Cl.² ............................. C03B 19/04
[52] U.S. Cl. ............................. 65/14; 65/15
[58] Field of Search ..................... 65/15, 14

[56] References Cited

U.S. PATENT DOCUMENTS

| | | | |
|---|---|---|---|
| 2,632,919 | 3/1953 | Koehler | 65/15 X |
| 2,758,335 | 8/1956 | Overman | 65/14 X |
| 3,060,498 | 10/1962 | Rubissow | 65/14 |
| 3,159,475 | 12/1964 | Chen et al. | 65/15 |

FOREIGN PATENT DOCUMENTS

| | | | |
|---|---|---|---|
| 145,788 | 3/1952 | Australia | 65/14 |
| 215,830 | 10/1957 | Australia | 65/15 |
| 531,816 | 10/1956 | Canada | 65/15 |

Primary Examiner—S. Leon Bashore
Assistant Examiner—Frank W. Miga
Attorney, Agent, or Firm—Larson, Taylor and Hinds

[57] ABSTRACT

Apparatus for manufacturing mineral fibers from a mineral melt. Two groups of spinner wheels are arranged symmetrically with respect to each other. Each group includes a primary spinner wheel which receives molten mineral and a secondary spinner wheel to which material is transferred from the primary spinner wheel. The wheels in each group are rotated on horizontal axes in opposite directions and the secondary spinner wheels are rotated in a direction such that at the place where they are closest to one another, the peripheral motion of each is upward. An air stream is directed horizontally and generally axially of the spinner wheels such that it sweeps over the peripheral surfaces of the spinner wheels for transferring fibers to a fiber collection surface.

6 Claims, 4 Drawing Figures

ARRANGEMENT FOR FIBRATION OF MOLTEN MINERAL

The present invention refers to an arrangement for the production of mineral wool by fibration of molten mineral in order to produce mineral wool, whereby a stream of liquid melt material is fed to one or more quickly rotating spinner wheels in such a way that the melt will attach to the circumference surface or surfaces, respectively, of the spinner wheel or spinner wheels, respectively, and thereafter be thrown out from this or them in the form of melt fibres, which are cooled and transported further or by means of a stream of air, blown around the spinner wheels.

In the production of mineral wool one uses as a rule a liquid melt collected from a melting oven, said melt having a temperature which is between about 1000° and 1400° C. The melt has been created by melting kinds of stone, slags, glass forming materials, as well as other inorganic materials in a melting oven which is usually a cupola oven. This melt, in the traditional method for production of mineral wool, is brought to flow down onto a first one of a number of quickly rotating spinner wheels, acting in cascade, rather often three or four such spinner wheels. These spinner wheels are rotating in pairs in direction opposite to each other, whereby the main part of the melt will be thrown out from the first spinner wheel to the spinner wheel following next thereafter and so on, until all of the amount of melt has been thrown away from the spinner wheels in the form of fibres. This method usually is called "spinning in cascade".

For the purpose not only to cool the fibres but also to transport them to a conveyor and collector band, on which they are collected and worked to mats, discs and so on for use as a thermal and/or acoustical insulation, one causes a stream of air around the spinner wheels for instance from a blast arrangement for distribution of the air. This air is brought to move along the outer circumference of the group of spinner wheels or the "spinning aggregate". It is intended that the movement of the air should take place substantially in parallel to the shafts of the spinner wheels.

Mineral products, produced in the way indicated above, often show a tensile strength which is less than satisfactory, and this means a disadvantage in the ready products which are easily thrown apart during transportation and mounting. The said lack of tensile strength also makes difficult different working procedures, in which the mineral wool is collected on the upper side of the said conveyor band in a rather thin layer in order there after to be given off in the form of a continuous web.

The present invention, therefore, has for its purpose the production of mineal wool by fibration, so called spinning, to give to the spun mineral wool a higher tensile strength than what is usually achieved by the above described traditional method.

One knows now, that the rather low tensile strength of mineral wool, produced in the traditional way by the cascade spinning method, depends upon the mineral wool mat to an essential degree being built up by pellet of mineral wool, but not by overweighing equally distributed fibres. These pellets may have a magnitude of up to some centimeters cross section, and they may in many a case have a density, which is essentially greater than the intended mean density of the product, in which the mineral wool shall be contained. The content of fibres in the parts of the mineral wool mat, positioned between these pellets, therefore, of course, will to a corresponding degree be less and will not give the required and satisfactory bond between the pellets with the consequence, that the bond between them is easily broken up, when the mineral wool is exposed to pulling strains during the following treatment. This will apply of whether this following treatment involves a continuous working of the produced mineral wool mat, transportation of the ready product, or handling of this product for instance at its mounting.

Comprehensive investigations forming basis of the present invention now have given at hand, that the formation of pellets in the hand or mat of mineral wool depends upon what happens in the vicinity of each of the spinner wheels in the aggregate. Thereby it will play an essential role that the peripheral speed of the wheels is greater, often even essentially greater than the speed of the stream of air, sweeping over the spinner wheels in substantially axial direction.

The result of this difference in speed, as a matter of fact, will be a whirl running in axial direction with a very strong turbulence. The newly formed fibres are thrown into this whirl, and in addition to deformation of the separate fibres thereby, the formation of pellets will take place which causes the above mentioned disadvantages.

It is true, that usually each pair of spinner wheels, in which the one is giving off melt and the other one is receiving melt, usually rotate in such a way, that the resulting whirls have different direction of rotation and thereby counter-act each other. However, it has proved suitable that the melt receiving wheel is kept in rotation with a speed, which is essentially higher than the speed of the melt giving off wheel. The reason for this has been, that one wanted to avoid or in any case to counter-act the cooling, to which the melt would be subjected during its successive movement through the series of spinner wheels. A rest whirl, therefore, will remain and this is still capable of giving the observed disadvantages. Such a rest whirl even may exist, if the wheels are rotating at same speed, provided that the thermal relations are different to a sufficient degree at the two wheels.

The invention therefore is based upon the principle, that one should make double the spinner aggregate in the form of two image symmetrically arranged aggregates situated close to each other, in which the last spinner wheels are rotating with such directions of rotation that the rest whirls of the two aggregates will completely extinguish each other. For this purpose, the two aggregates must also be situtated rather close to each other.

The present invention, thus, refers to an arrangement for fibration of a mineral melt under use of two spinner wheel aggregates, arranged image symmetrically in relation to each other, each of them comprising a first quickly rotating spinner wheel, receiving melt, and hereinafter called the primary spinner wheel, and a further spinner wheel arranged in cascade in relation to the primary spinner wheel and arranged in its turn to give off fibres to a collector band, hereinafter referred to as the secondary spinner wheel. Also the directions of rotations of the spinner wheel are image symmetrical in relation to each other.

According to the invention a fan or similar arrangement is provided for transferring the fibres to the collector band under the influence of a stream of air, which is directed substantially in parallel to the shafts of the spinner wheels, and which is brought to move over the mantle surfaces of the spinner wheels, substantially in an axial direction. Each of the two pairs of spinner wheels in these two aggregates is arranged to rotate in directions opposite to each other, and the secondary spinner wheels are arranged to rotate in such a direction, that, at the place where they are most close to each other, the peripheral direction of movement will take place from below and upwardly.

According to an especially preferred form of execution of the invention, the two spinner aggregates are so arranged in relation to each other that the two secondary spinner wheels are situated in immediate vicinity of each other with a very little distance between them.

How great this distance should be, to some extent depends upon the type of mineral, which is spun to fibres, and also upon the temperature of the melt, which will determine its viscosity. This difference, therefore, cannot be exactly and once for all stated but the stipulation of same will not cause the man skilled in the art any difficulty, after he has got understanding of the general idea of the present invention.

In each of the spinner wheel aggregates, corresponding spinner wheels should be positioned substantially in the same horizontal plane. However, it has proved that further advantages are possible to gain by arranging the two spinner wheel aggregates in such a way that their peripheral levels form an angle, the point of which is directed against the stream of air, flowing over the mantle surfaces of the spinner wheels. By this, any particles, which have not been fibrated, so called "pearls" will not be introduced from the one aggregate into the air and fibre stream from the other one and vice versa. Instead, the pearls are thrown out in the level of the spinner wheels without, to any substantial extent, to be deviated by the stream of air flowing over the mantle surfaces of the spinner wheels. The fibres created on the other side, are deviated, because the stream of air is, as a matter of fact, dimensioned for such a function.

The invention will be further described below in connection with a couple of forms of execution shown in the attached drawings, but it is understood, that the invention shall not be limited to these two forms of execution, but that all different kinds of modifications may exist within the scope of the invention.

Figure 2:
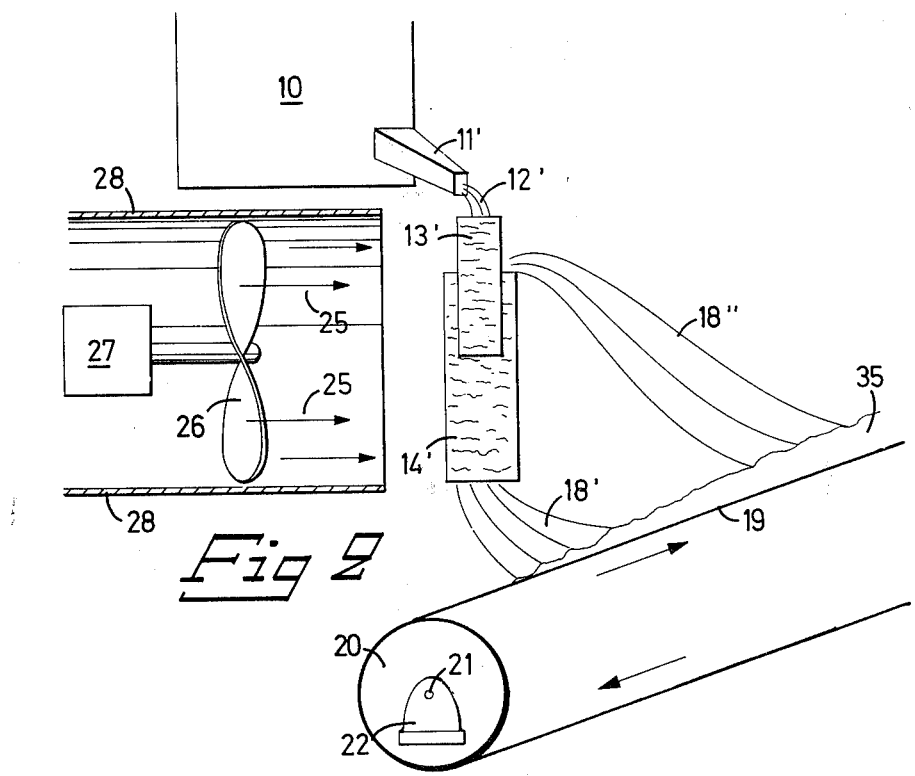

In the drawings,

FIG. 1 shows in strongly schematical form the picture of the two co-operating spinner aggregates according to a first form of execution of the invention, seen in the direction of the shafts of the spinner wheels, and FIG. 2 shows a picture perpendicular thereto.

Figure 3:
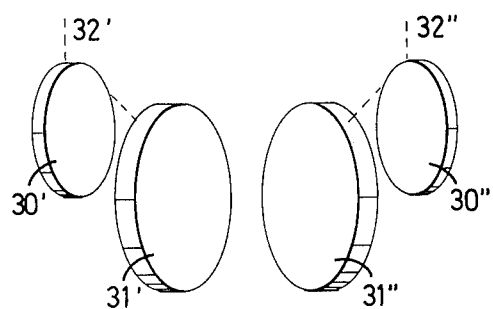
Figure 4:
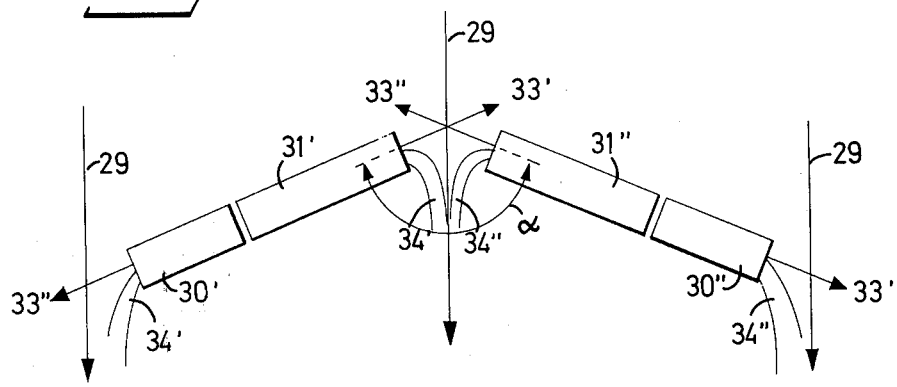

FIG. 3 schematically shows a somewhat different form of execution of the invention, in which the spinner wheels have been shown perspectively, and FIG. 4 shows the last mentioned arrangement in projection from above in FIG. 3.

In FIG. 1 the lower part 10 of a cupola oven is shown, said oven being used for melting the mineral used. As the two spinner aggregates shall be fed each with its stream of melt, the melting oven can be provided, as shown in FIG. 1, with two outlets 11' and 11". However, one may also use two separate melting ovens. It is also possible to use only one single melting oven with only one outlet, whereby the flow of melt is divided into two branches. The melt 12' and 12", respectively, coming from the two outlets 11' and 11", thus is directed onto the receiver spinner wheels 13' and 13" in the spinner aggregates concerned. These spinner wheels 13' and 13" will be referred to hereinafter as the "primary" spinner wheels. FIG. 1 also shows the "secondary" spinner wheels 14' and 14". The primary spinner wheels thus will receive mineral melt from the oven 10, so that a sheet or a layer of such melt will be formed on the peripheral surface of these spinner wheels at 15' and 15", respectively. By centrifugal force, the melt is thrown out in a state 16', 16" which is in any case mellowed and possibly also to some degree coarse fibrated, said melt being thrown to the secondary spinner wheels 14' and 14", where the melt is again positioned as a layer 17' or 17", respectively on the secondary spinner wheels 14', 14".

From the secondary spinner wheel 14', 14" in each of the two spinner wheel aggregates thereafter by centrifugal force the formed fibers are thrown out in the form of a veil 18' and 18", respectively in order to be transferred to a collector band 19, where they are stored up as a mat 35. The collector band 19 suitably is made as a perforated metallic band, running endlessly over at least two rollers, of which only one roller 20 is shown in the drawing. One of the two rollers in a way known per se is arranged to drive the band 19. The roller 20 shown in the drawing rests on a shaft 21, which is mounted in a bearing 22.

As the primary spinner wheels 13 have in first place for their purpose to mellow up the melt 12 deposited and only to a smaller degree to fibrate it, and to throw it further onto the secondary spinner wheel 14, where the fibration proper will take place, the primary spinner wheels 13', 13" have a smaller diameter than the secondary spinner wheels 14', 14", and they rotate at a lower speed. Due to the higher peripheral speed and the greater diameter of the secondary spinner wheels 14', 14", an advantageous centrifugal action will be created.

The spinner wheels rotate in the direction of the arrows 23', 23", 24' and 24", indicated inside of each spinner wheel. A stream of air 25, created by a fan device 26, driven by a motor 27, is brought to pass the spinner wheel aggregates substantially in axial direction in relation to the spinner wheels. The stream of air is guided by a drum 28 to reach the spinner wheel aggregate. The stream of air, of course, can also be arranged in another way, for instance, by a strong sub-pressure created below the collctor band 19.

When the stream of air 25 passes the spinner wheels 13', 13", 14' and 14", it is brought into rotation with a component of movement in the direction of the peripheral movement of the spinner wheels, so that whirls are created. These whirls counter-act or extinguish another in pairs, so that the fiber veil 18, containing the fibers emanating from the secondary spinner wheels 14' and 14" and to some extent from the primary spinner wheels 13' and 13", will without any observable turbulence to be transferred to the collector band 19.

FIGS. 3 and 4 show an arrangement according to the invention, somewhat different, in which the two spinner wheel aggregates are positioned in a given angle in relation to each other. This angle α is directed with its point against the stream of air 29. In FIGS. 3 and 4, 30' and 30" indicate the two primary spinner wheels and 31' and 31" indicate the two secondary spinner wheels. Melt is fed in the form of the two flows of melt 32' and 32" to the primary spinner wheels 30' and 30". From these spinner wheels the non-fibrated material 33', 33" or perhaps only unessentially fibrated material is thrown out in the level of the wheels 30', 30", whereas the fiber veil 34' 34" is caught by the stream of air 29 and brought away in the direction downwardly in FIG. 4.

In practical tests with an arrangement according to the present invention it has been found, that no formation of whirls caused by a peripheral component in the direction of the formed veil 18 onto the band 19 could be observed, and that as a consequence thereof, the spun mineral wool mat 35, see FIG. 2, got an essentially higher tensile strength than such mats, which were produced in traditional spinner wheel aggregates. This, accords to what the investigations have proved, in the first place depends upon that no formation of mineral wool pellets could be observed.

We claim:

1. Apparatus for manufacturing mineral fibers from a mineral melt comprising, in combination:
   two spinner wheel aggregates arranged image-symmetrically with respect to each other and each comprising a primary spinner wheel rotatable on a substantially horizontal axis for receiving melt and a secondary spinner wheel rotatable on a substantially horizontal axis and arranged in cascade relation to the primary spinner wheel for receiving material therefrom and for giving off mineral fibers to a colletor band, the directions of rotation of the primary and secondary spinner wheels, respectively, being image-symmetrical relative to one another;
   means for supplying mineral melt to the primary spinner wheel of each spinner wheel aggregate;
   a collector band for receiving mineral fibers given off by said secondary spinner wheels;
   means for blowing a stream of air in a substantially horizontal direction and generally axially of said spinner wheels over the mantle surfaces of the spinner wheels for transferring fibers from said secondary spinner wheels to said collector band, said primary and secondary wheels in each spinner wheel aggregate in opposite directions and for rotating said secondary spinner wheels in a direction such that at the place where they are closest to one another, the peripheral direction of motion of each takes place from down to upwardly.

2. Apparatus according to claim 1 wherein primary and secondary spinner wheels of each spinner wheel aggregate are disposed symmetrically on either side of a vertical axis of symmetry, with the secondary spinner wheel of each spinner wheel aggregate closer to said axis of symmetry than the primary spinner wheel thereof.

3. Apparatus according to claim 2 wherein the spinner wheels rotate on horizontal axes.

4. Apparatus according to claim 3 wherein the spinner wheel axes are disposed at acute angle to the direction of said stream of air such that the secondary spinner wheels rotate in planes which intersect in an obtuse angle the point of which is directed against said air stream.

5. Apparatus according to claim 1 further comprising means for rotating said secondary spinner wheels at higher angular velocity than that of said primary spinner wheels.

6. Apparatus according to claim 1 wherein said secondary spinner wheels have larger diameter than the primary spinner wheels.

* * * * *